Aug. 11, 1942.  F. M. PALMER  2,292,654
INDICATING DEVICE
Filed Feb. 28, 1940  2 Sheets-Sheet 1
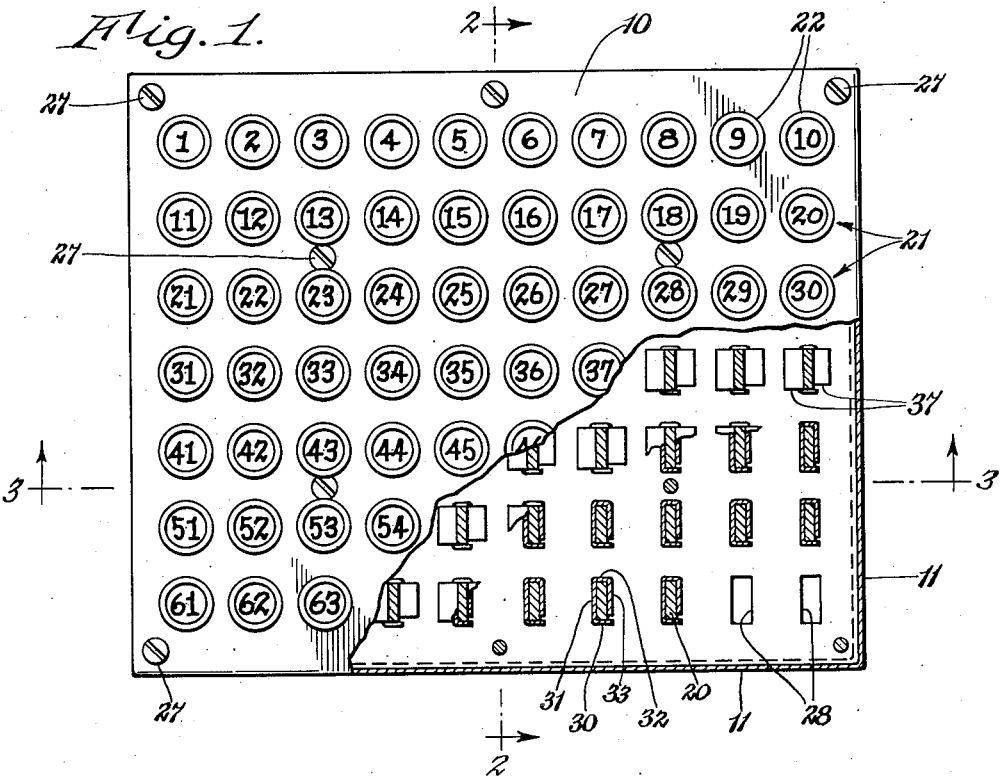
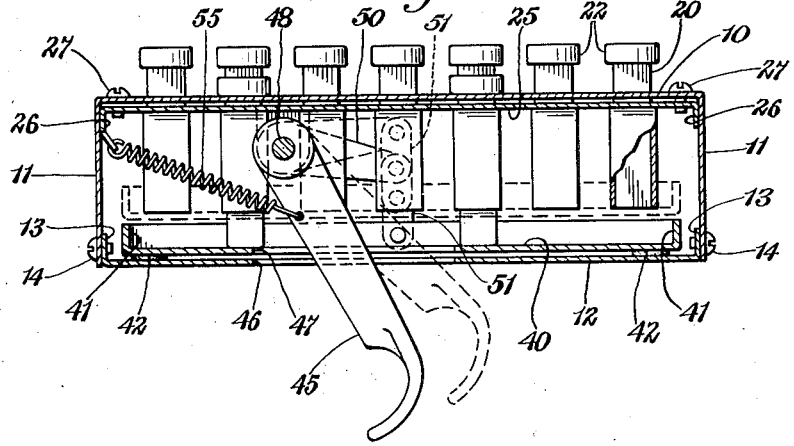
Frederick M. Palmer INVENTOR
BY Popps and Popps ATTORNEYS

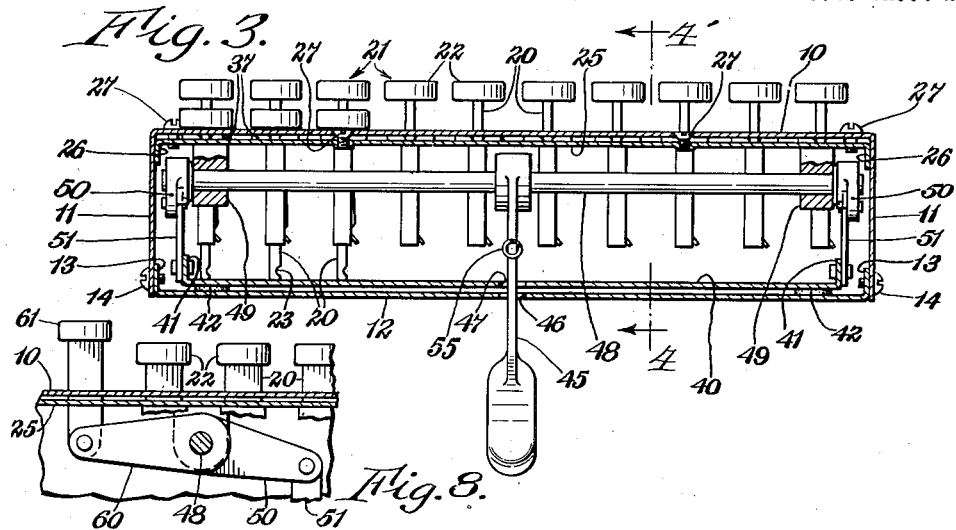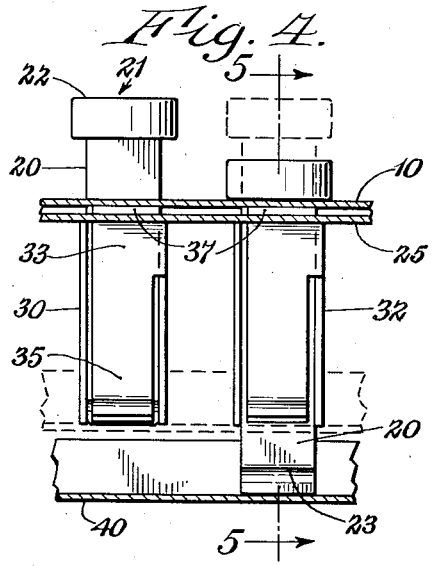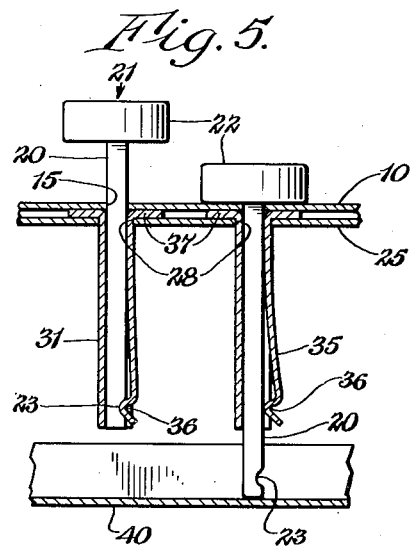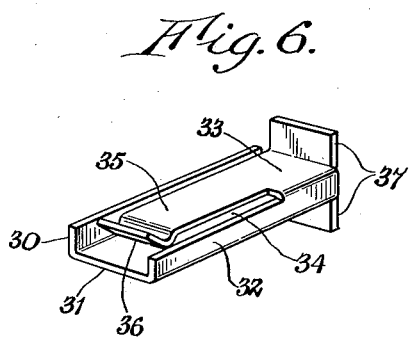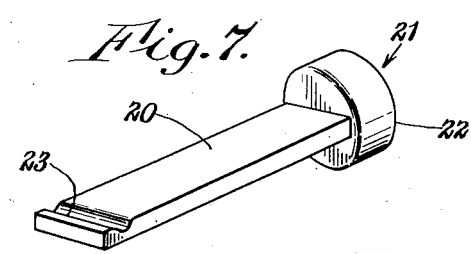

Patented Aug. 11, 1942

2,292,654

UNITED STATES PATENT OFFICE 2,292,654

INDICATING DEVICE

Frederick M. Palmer, Alfred Station, N. Y.

Application February 28, 1940, Serial No. 321,329

15 Claims. (Cl. 116—135)

This invention relates to an indicating device and more particularly to an indicating device by which the driver of a school bus can easily and effectively keep track of the individual school children he is transporting to and from the school.

One of the principal objects of the invention is to provide such an indicator which includes a plurality of numbered keys each of which corresponds to a particular school child, the children announcing the numbers on entering the bus and the driver depressing the corresponding key. By this means the driver on reaching the school is immediately apprised of all children who were not brought along and can immediately render a report. The use of the indicator also facilitates the return of the children from school inasmuch as the driver can inquire as to any children who were brought to school but are not returning and thus avoid the necessity of returning for an individual child who failed to board the bus at the proper time.

Another object of the invention is to provide such an indicator board which is of simple and inexpensive construction and readily operated and in particular is provided with a simple mechanism for resetting all of the keys to their inactive positions.

Another aim of the invention is to provide such a resetting mechanism in which the operating handle is so positioned that it cannot readily be manipulated by the entering or leaving school children, thereby avoiding the danger of destroying the record through the mischief of one of the children.

Another aim of the invention is to provide an all metal indicating mechanism in which the keys are individually and easily removable. This facilitates the use of the indicator inasmuch as the bus driver can group his keys in any convenient manner and physically remove the keys between the groups, the absence of the keys avoiding possible confusion is operating the indicating board. It will also be seen that in the event of the extended sickness of a child the driver can remove his key.

Another object of the invention is to provide individual guideways for the keys, which guideways are assembled into the completed indicator. This greatly reduces the cost of the board inasmuch as the cost of forming a multiplicity of guideways in a single sheet of metal would necessarily be costly.

Another purpose of the invention is to provide such individual guideways, each of which includes a spring which cooperates to hold the key either in its extended or depressed position and at the same time permits of the ready removal of the key. The guideway is also so formed that the key is prevented from rotating, thereby maintaining all the numbers in normal relation and facilitating the use of the indicator.

Another object of the invention is to provide an indicator in which the entire mechanism is carried by a single internal panel removably secured within the casing of the tabulator. By this means inspection and repair of the indicator is facilitated inasmuch as this panel can be readily removed to expose the operating mechanism.

Another aim of the invention is to provide such an indicator which is durable and will stand up under conditions of severe and constant use without getting out of order or requiring repair.

In the accompanying drawings:

Fig. 1 is a top plan view, partly in section, of an indicator made in accordance with my invention.

Figs. 2 and 3 are vertical sections, taken on the correspondingly numbered lines of Fig. 1.

Fig. 4 is an enlarged fragmentary vertical section, taken on line 4—4, Fig. 3.

Fig. 5 is an enlarged fragmentary vertical section, taken on line 5—5, Fig. 4.

Fig. 6 is a perspective view of one of the individual guideways for the several keys of the indicator.

Fig. 7 is a perspective view of one of the keys.

Fig. 8 is a view similar to Fig. 2 and showing a modified form of the operating mechanism for the restoring or resetting panel of the indicator.

The indicator is preferably of all metal construction and includes a casing having a flat rectangular top 10 provided with four depending side walls 11, the underside of this casing being closed by a rectangular bottom panel 12 having upstanding flanges 13 which fit the inner faces of the side walls 11. The bottom 12 is removably secured in any suitable manner as by screws 14.

The top panel 10 of the casing is provided with a plurality of regularly spaced openings 15, these openings being in the form of elongated slots and being arranged in regular order in rows extending both horizontally and vertically across the board, as viewed in Fig. 1. Each of these openings 15 receives the flat metal stem 20 of a key, indicated generally at 21, the key having a round flat topped head 22 bearing an individual number, the several keys being, of course, numbered in regular order as illustrated in Fig. 1. The stem 20 of each of the keys is provided on one side and near its inner end with a rounding transverse groove 23, as best shown in Fig. 7.

Immediately below the casing panel 10 is arranged a second panel 25 which is of rectangular form and preferably flanged downwardly at its edges, as indicated at 26, to provide the necessary rigidity. The downwardly flanged edges 26 of this panel preferably fit the inner faces of the walls 11 of the casing and this inner panel 25 is shown as held in place by a plurality of screws 27, the heads of which bear against the outer face of the top panel 10. These screws can be provided in any desired number to adequately support the inner panel 25 in fixed relation to the panel 10 of the casing.

This inner panel 25 receives and supports the individual guideways for the several keys and for this purpose is provided with a plurality of elongated holes 28, these holes 28 registering with the holes 15 of the outer panel 10.

Each of the individual guideways is preferably formed of sheet metal and as best shown in Fig. 6 includes a side wall 31, one edge of which is bent to form an end wall 30 and the other edge of which is bent to form an end wall 32, this last end wall being also bent to form the opposite side wall 33. At the lower end of the guideway a slot 34 is preferably provided between the end wall 32 and the side wall 33 so as to provide a spring catch or detent 35 which forms the lower part of one wall of the guideway. The lower end of each spring 35 is preferably beaded inwardly, as indicated at 36, to fit the transverse groove 23 provided at the lower end of the stem of each key. At its upper end each of the side walls 31 and 33 is provided with a laterally extending flange 37.

The holes 28 in the inner panel 25 are made of such size as to receive the upper ends of the guideways, the guideways being supported by the flanges 37 which are arranged against the upper face of this panel. In assembling the indicator a guideway is fitted in each of the holes 28 of the inner panel 25 and when this panel is secured in position by the screws 27, the flanges 37 of the several guideways are held between the supporting panel 25 and the outer panel 10 so that the guideways are securely held in proper position.

The keys are inserted from the front of the otherwise assembled indicator. In assembling the keys the stems are inserted through the openings 15 in the outer panel 10 and into the guideways arranged immediately thereunder. The keys are all inserted so that the sides provided with the grooves 23 engage the beads 36 of the springs 35. Upon being moved to their projected positions, as indicated at the left of Figs. 4 and 5, the beads 36 of the springs 35 enter the grooves 23 of the keys so as to yieldingly hold the keys in a uniform outwardly projected position and at the same time permit the entire key to be withdrawn or reinserted as may be desirable. When the school child entering the bus announces his number the driver presses the corresponding key so as to move it to the position shown at the right of Figs. 4 and 5. Those keys which remain projected outwardly can readily be distinguished from those keys which are depressed in the same manner as in a commercial adding machine.

When the bus arrives at the school the driver can immediately report the absentees by reference to the indicator, the absentees being, of course, reported by the keys which remain elevated. It will be understood that the bus driver quickly memorizes the numbers corresponding to the different school children so that no problem is presented by the use of numbers for the several keys. After reporting the absentees it is necessary for the driver to restore all of the keys to their normal outwardly projected positions preparatory to picking up the next group of school children. To facilitate this a resetting mechanism is provided which by the simple operation of a lever will restore all of the keys to a uniformly projected position. For this purpose a metal panel 40 is arranged within the casing and is normally disposed against the bottom 12. For rigidity this panel is preferably flanged upwardly at its edges, as indicated at 41, and to prevent this restoring panel from rattling against the bottom of the casing a plurality of cushioning pads 42 of fiber or other sound deadening material are interposed between the restoring panel and the bottom and secured in any suitable manner to one or the other.

When the restoring panel 40 is raised it engages the lower ends of the stems 20 of all of the keys and moves any depressed keys outwardly. Since the upward movement of this restoring panel 40 is limited by the downwardly projecting ends of the guideways, it will be seen that the upward movement of this panel will restore all of the keys to uniformly projected positions.

To so move the keys upwardly, a hand lever 45 is provided which projects through slots 46 and 47 provided, respectively, in the bottom panel 12 and the restoring panel 40, as best shown in Fig. 2. The outer end of this restoring lever 45 is preferably made in the form of a trigger and its inner end is formed to provide a hub suitably secured to a rock shaft 48 arranged within the casing between two horizontal rows of keys. At its opposite ends this rock shaft is supported in bearing brackets 49 which can be secured to the underside of the inner panel 25 in any suitable manner.

Beyond these bearing brackets 49 each end of the rock shaft 48 carries a rock arm 50. The end of each of these rock arms 50 carries a link 51 which extends downwardly and is pivotally secured to the adjacent upstanding flange 41 of the restoring panel 40, as best shown in Fig. 3. It will be seen that upon moving the restoring lever 45 from the full to the dotted line position shown in Fig. 2, the rock shaft 48 is rocked to elevate its rock arms 50 and lift the restoring panel 40 from the full line position shown in Fig. 2 into engagement with the lower ends of the guides, as shown by dotted lines in this figure. The restoring panel and other parts of the restoring mechanism are yieldingly held in a retracted inoperative position by a return spring 55 which is shown as secured at one end to the restoring lever 45 and at its other end to a suitable anchorage formed in one of the depending flanges 26 of the inner panel 25.

If desired, the restoring mechanism can be operated by means of a key from the front of the indicator. Such a modified form of the invention is illustrated in Fig. 8 in which the rock shaft 48 is provided with an additional rock arm 60 which projects in the opposite direction from the two end rock arms 50. A restoring key 61 is provided which projects through the outer and inner panels 10 and 25 and can be guided in any suitable manner and the lower end of which is pivotally secured to the rock arm 60 in any suitable manner. In other respects the mechanism of this modified form of the invention illustrated in Fig. 8 is identical with the preferred form illustrated in Figs. 1-7 and it will also be seen that depressing the restoring key 61 will rock the rock shaft 48 to lift the restoring panel 40 and restore the keys to a uniformly projecting position in the same manner as described with reference to the form of the invention shown in Figs. 1-7.

In use the indicator is preferably mounted on the dash of the school bus or at any place in front of the driver and within convenient reach. As the school children severally enter the bus they call out their numbers and the driver depresses the corresponding keys. When the bus reaches the school those keys which are not depressed represent the absentees and the driver can immediately mark the absentees on a suitable printed form and send it to the school authorities. The driver then moves the restoring lever 45 from the full to the dotted line position shown in Fig. 2. This movement rocks the rock shaft 48 which in turn swings the rock arms 50 to the dotted line position shown in Fig. 2, thereby lifting the links 51 and the restoring panel 40 carried thereby. This projects the stems 20 of all of the keys outwardly until the restoring panel 40 engages the ends of the key guideways, the keys being thereby all restored to a uniformly projected condition. Upon releasing the lever 45 the return spring 55 returns the restoring lever 45 to the full line position shown in Fig. 2 in which the restoring panel is moved into engagement with the bottom of the casing, as illustrated by full lines in Fig. 2. The driver can thereupon pick up another group of school children using the same indicator for keeping track of those in the bus and absentees. If any of the children discontinue use of the bus for an extended period of time, through illness or otherwise, the driver merely pulls out the key bearing this child's number. This avoids the confusion of always having this particular key undepressed at the end of the run and at the same time avoids possible confusion with the other keys. It will also be noted that the indicator is very easy to repair, inasmuch as the entire operating mechanism is carried by the removable internal panel 25. Thus, if inspection or repair of the mechanism is required the operator first removes all of the keys 21 by pulling them out directly from the guideways. He then removes the bottom plate 12 and thereafter by removing the screws 27 releases the inner panel 25. This panel on being released drops through the bottom of the casing carrying with it the many guideways for the keys as well as the entire restoring mechanism. It will be noted in this connection that the bearings which carry the rock shaft 48 of this restoring mechanism are secured to this inner panel 25 and also that the end of the return spring 55 is anchored to this panel. This construction further greatly facilitates the manufacture and assembly of the indicator.

From the foregoing it will be seen that the present invention provides a very simple, inexpensive and durable indicator particularly adapted for keeping track of school children in transporting them to and from school in a school bus and which greatly facilitates the rendering of reports to the school authorities. At the same time the use of the indicator in no way interferes with the normal running of the bus so as to render it a possible safety hazard and the indicator is so constructed that an accurate report can be made from it and it can be readily restored to its original condition. It will also be seen that the restoring of the indicator merely requires the pulling of a lever which is so arranged as to be out of convenient reach of the school children and which is, in turn, restored to its normal position by a return spring.

I claim as my invention:

1. An indicator, comprising a casing, a plurality of keys slidably mounted in said casing and adapted to be depressed inwardly relative to said casing, means for supporting said keys, and means for restoring the depressed keys to an outwardly projected position including a means arranged within said casing to engage all of said keys and manually movable means for moving said key engaging means in a direction to engage and positively propel said depressed keys to said outwardly projected position.

2. An indicator, comprising a casing, a plurality of keys slidably mounted in said casing and adapted to be depressed inwardly relative to said casing, means for supporting said keys, and means for restoring the depressed keys to a uniform outwardly projected position including a single means of substantial area arranged within said casing to engage all of said keys manually movable means for moving said key engaging means in a direction to engage and positively propel said depressed keys to said outwardly projected position.

3. An indicator, comprising a casing, a plurality of keys slidably mounted in said casing and adapted to be depressed inwardly relative to said casing, means for supporting said keys, and means for restoring the depressed keys to an outwardly projected position comprising a plate disposed below said keys and adapted to raise said keys, a rock shaft arranged in said casing, a rock arm fast to said rock shaft, means for connecting said rock arm to said plate, and means for rotating said rock shaft.

4. An indicator, comprising a casing, a plurality of keys slidably mounted in said casing and adapted to be depressed inwardly relative to said casing, means for supporting said keys, and means for restoring the depressed keys to an outwardly projected position comprising a single plate of substantial area disposed below said keys, a rock shaft arranged within said casing, a rock arm fast to each end of said rock shaft, a link connecting each of said rock arms to said plate, and means for rotating said rock shaft.

5. An indicator, comprising a casing, a plurality of vertically movable keys each having a stem which is out of round in cross section, and guiding means within said casing for slidingly receiving and retaining the stem of each of said keys including a tubular body having a side wall, an end wall at one edge of said side wall and formed integrally therewith, another end wall arranged at the opposite edge of said side wall and formed integrally therewith, a second side wall formed integrally with said last mentioned end wall but disconnected from said first mentioned end wall, and means associated with one of said walls for retaining the stem of the corresponding key in said guiding means when inserted therein.

6. An indicator, comprising a casing, a plurality of vertically movable keys, and guiding means for slidingly receiving and retaining each of said keys on said casing including a tubular body having a side wall, an end wall at one edge of said side wall and formed integrally therewith, another end wall arranged at the opposite edge of said side wall and formed integrally therewith, and a second side wall formed integrally with said last mentioned end wall but disconnected from said first mentioned end wall, said tubular body having a slot whereby a part of said second side wall forms a spring detent which is adapted to resiliently engage the respective key sliding in said tubular body.

7. An indicator, comprising a casing, a plurality of vertically movable keys, and guiding means for slidingly receiving and retaining each of said keys on said casing including a tubular body having a side wall, an end wall at one edge of said side wall and formed integrally therewith, another end wall arranged at the opposite edge of said side wall and formed integrally therewith, and a second side wall formed integrally with said last mentioned end wall but disconnected from said first mentioned end wall, said tubular body having a slot whereby a part of said second side wall forms a spring detent which is adapted to resiliently engage the respective key sliding in said tubular body, and said detent and key being provided respectively with an interengaging bead and recess.

8. An indicator, comprising a casing including a top panel provided with a plurality of openings, an inner panel provided with a plurality of openings each of which is alined with one of the openings in said top panel, a plurality of individual key guideways each extending through one of the openings in said inner panel and means associated with each of said guideways and interposed between said top and inner panels to support said guideways between said top and inner panels, a plurality of keys each extending through one of the openings in said top panel and slidable in the respective guideway, said keys being readily and manually rectilinearly removable.

9. An indicator, comprising a casing having a top panel provided with a plurality of openings, an inner panel arranged below said top panel and provided with a plurality of openings each of which is in line with one of the openings in said top panel, a plurality of key guideways each of which includes a tubular body arranged in one of the openings in said inner panel and is provided with a flange arranged between said top and inner panels, and a plurality of keys each of which has a stem slidable in the body of one of said guideways.

10. An indicator, comprising a casing including a top panel provided with a plurality of openings, an inner panel provided with a plurality of openings each of which is alined with one of the openings in said top panel, a plurality of key guideways each extending through one of the openings in said inner panel and supported between said top and inner panels, a plurality of keys each extending through one of the openings in said top panel and readily removably and slidably mounted in the respective guideway and adapted to be depressed inwardly relative to said casing, said guideways including spring means for yieldingly holding said keys in a uniform outwardly projected position, and means for restoring the depressed keys to a uniform outwardly projected position.

11. An indicator, comprising a casing including a top panel provided with a plurality of openings, an inner panel provided with a plurality of openings each of which is alined with one of the openings in said top panel, an individual guideway extending through each of the openings in said inner panel and including a spring detent and supporting flanges, said flanges being disposed between said top and inner panels, a plurality of readily removable keys adapted to be depressed inwardly relative to said casing, each of said keys including a stem provided with a groove and said stem extending through one of the openings in said top panel and slidable in the corresponding guideway and said groove being adapted to be engaged by said spring detent for yieldingly holding said key in an outwardly projected position, and means for restoring the depressed keys to a uniform outwardly projected position.

12. An indicator, comprising a casing, an inner panel secured to said casing, a plurality of individual guideway members supported by said inner panel, said guideway members being provided with portions interposed between and in joint engagement with said inner panel and casing whereby said casing retains said guideway members in position on said inner panel, a plurality of keys each of which is slidably mounted in one of said guideway members and projects through a registering opening in said casing to be manually operable from the exterior of said casing and being adapted to be depressed inwardly relative to said casing, said keys being readily and manually rectilinearly removable, and restoring means mounted below said inner panel for restoring the depressed keys to an outwardly projected position.

13. An indicator, comprising a casing including a removable bottom, an inner panel removably secured to said casing, a plurality of individual guideway members supported by said inner panel, said guideway members being provided with portions interposed between and in joint engagement with said inner panel and casing whereby said casing retains said guideway members in position on said inner panel, a plurality of keys each of which is slidably mounted in one of said guideway members and projects through a registering opening in said casing to be manually operable from the exterior of said casing and being adapted to be depressed inwardly relative to said casing, said keys being readily and manually rectilinearly removable, and restoring means mounted below the underside of said inner panel for restoring the depressed keys to an outwardly projected position, said inner panel, said guideway members and said restoring means being adapted to be withdrawn from said casing through said removable bottom.

14. An indicator, comprising a casing, a inner panel secured to said casing, a plurality of individual guideways supported by said inner panel, a plurality of keys each of which is slidably mounted in one of said guideways and adapted to be pushed inwardly manually relative to said casing, and key restoring means mounted on said inner panel comprising a plate, bearings depending from said inner panel, a rock shaft journaled in said bearings, a pair of rock arms fast to said rock shaft, means connecting said rock arms with said plate, and means for rotating said rock shaft thereby to elevate said plate.

15. An indicator, comprising a casing, an inner panel secured to said casing, a plurality of individual guideways supported by said inner panel, a plurality of keys each of which is slidably mounted in one of said guideways and adapted to be pushed inwardly manually relative to said casing, and key restoring means mounted on said inner panel and comprising a plate, bearings depending from said inner panel, a rock shaft journaled in said bearings, a rock arm mounted on said rock shaft adjacent each end thereof, a link connecting each of said rock arms with said plate and an operating lever connected with said rock shaft.

FREDERICK M. PALMER.